(12) United States Patent
Pouli et al.

(10) Patent No.: US 11,488,289 B2
(45) Date of Patent: Nov. 1, 2022

(54) METHOD FOR DETECTION OF SATURATED PIXELS IN AN IMAGE

(71) Applicant: INTERDIGITAL VC HOLDINGS, INC., Wilmington, DE (US)

(72) Inventors: Tania Foteini Pouli, Le Rheu (FR); Mekides Abebe, Poitiers (FR); Chaker Larabi, Poitiers (FR); Jonathan Kervec, Paimpont (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/090,262

(22) PCT Filed: Mar. 27, 2017

(86) PCT No.: PCT/EP2017/057222
§ 371 (c)(1),
(2) Date: Sep. 30, 2018

(87) PCT Pub. No.: WO2017/167700
PCT Pub. Date: Oct. 5, 2017

(65) Prior Publication Data
US 2019/0114749 A1     Apr. 18, 2019

(30) Foreign Application Priority Data
Mar. 30, 2016     (EP) ................... 16305372

(51) Int. Cl.
*G06T 5/00*     (2006.01)
*G06T 7/11*     (2017.01)
(Continued)

(52) U.S. Cl.
CPC .............. *G06T 5/008* (2013.01); *G06T 5/001* (2013.01); *G06T 5/009* (2013.01); *G06T 7/11* (2017.01);
(Continued)

(58) Field of Classification Search
CPC ......... G06T 5/008; G06T 5/009; G06T 7/136; G06T 5/001; G06T 7/90; G06T 7/11; G06T 2207/10024; H04N 1/6027; H04N 1/6008
See application file for complete search history.

(56) References Cited

U.S. PATENT DOCUMENTS 5,231,504 A     7/1993  Magee
8,026,953 B2    9/2011  Lammers et al.
(Continued)

FOREIGN PATENT DOCUMENTS

CN     101714340        8/2012
JP     2006303559 A    11/2006
(Continued)

OTHER PUBLICATIONS

Gijsenij et al., "Computational Color Constancy: Survey and Experiments", IEEE Transactions on Image Processing, vol. 20, No. 9, Sep. 2011, pp. 2475-2489.
(Continued)

*Primary Examiner* — Minjung Kim
(74) *Attorney, Agent, or Firm* — Yin Shao

(57) ABSTRACT

According to the invention, the saturation thresholds ($th_r$; $th_g$; $th_b$) used for this detection depend on color coordinates ($r_w$, $g_w$, $b_w$) representing an illuminant (ILL) of the image.

10 Claims, 1 Drawing Sheet

(51) Int. Cl.
  *G06T 7/90* (2017.01)
  *H04N 1/60* (2006.01)
  *G06T 7/136* (2017.01)

(52) U.S. Cl.
  CPC ............... *G06T 7/136* (2017.01); *G06T 7/90* (2017.01); *H04N 1/6008* (2013.01); *H04N 1/6027* (2013.01); *G06T 2207/10024* (2013.01)

(56) References Cited

U.S. PATENT DOCUMENTS

| | | | |
|---|---|---|---|
| 8,144,216 B2 | 3/2012 | Shiraishi | |
| 8,154,560 B2 | 4/2012 | Kurokawa et al. | |
| 8,331,665 B2 | 12/2012 | Cordes et al. | |
| 8,830,350 B2 | 9/2014 | Yamada et al. | |
| 9,171,215 B2 | 10/2015 | Kanou et al. | |
| 2002/0163525 A1 | 11/2002 | Liao et al. | |
| 2004/0246336 A1* | 12/2004 | Kelly, III | G06K 9/00771 348/143 |
| 2005/0123211 A1* | 6/2005 | Wong | G06T 5/20 348/E9.053 |
| 2006/0146193 A1 | 7/2006 | Weerasinghe et al. | |
| 2012/0200589 A1* | 8/2012 | Min | H04N 1/6008 345/591 |
| 2014/0375849 A1* | 12/2014 | Komatsu | H04N 9/646 348/242 |
| 2015/0063690 A1* | 3/2015 | Chiu | G06K 9/46 382/165 |
| 2016/0191802 A1* | 6/2016 | Martinello | H04N 5/23267 348/208.4 |
| 2016/0350900 A1* | 12/2016 | Barron | G06T 5/001 |

FOREIGN PATENT DOCUMENTS

| | | |
|---|---|---|
| JP | 2006333313 A | 12/2006 |
| JP | 2010062920 A | 3/2010 |
| JP | 2010103700 A | 5/2010 |
| JP | 2010161557 A | 7/2010 |
| JP | 2015092301 A | 5/2015 |
| JP | 2015092643 A | 5/2015 |
| KR | 101136345 | 4/2012 |
| RU | 2006102386 A | 8/2007 |
| WO | WO 2005117454 A1 | 12/2005 |
| WO | WO 2013108493 A1 | 7/2013 |
| WO | 2015113881 A1 | 8/2015 |

OTHER PUBLICATIONS

Huo et al., "Robust Automatic White Balance Algorithm using Gray Color Points in Images", IEEE Transactions on Consumer Electronics, vol. 52, No. 2, May 2006, pp. 541-546.
Guo et al., "Correcting Over-Exposure in Photographs", 2010 IEEE Computer Society Conference on Computer Vision and Pattern Recognition, San Francisco, California, USA, Jun. 13, 2010, pp. 515-521.
Didyk et al., "Enhancement of Bright Video Features for HDR Displays", Eurographics Symposium on Rendering 2008, vol. 27, No. 4, (2008), 10 pages.
Masood et al., "Automatic Correction of Saturated Regions in Photographs using Cross-Channel Correlation", Pacific Graphics 2009, vol. 28, No. 7, (2009), 9 pages.
Khan et al., "Compensation for Specular Illumination in Acne Patients Images Using Media Filter", 2014 5th International Conference on Intelligent and Advanced Systems (ICIAS 2014), Kuala Lumpur, Malaysia, Jun. 3, 2014, 4 pages.
Fu et al., "Correcting Saturated Pixels in Images", Digital Photography VIII, Proceedings of SPIE-IS&T Electronic Imaging, vol. 8299, No. 1, Jan. 22, 2012, 11 pages.
JP2015092301—English Translation.
JP2010062920—English Translation.
JP2006333313—English Translation.
JP2015092643A—English Translation.
JP2006303559 A—English Abstract, Abstract Only.

\* cited by examiner

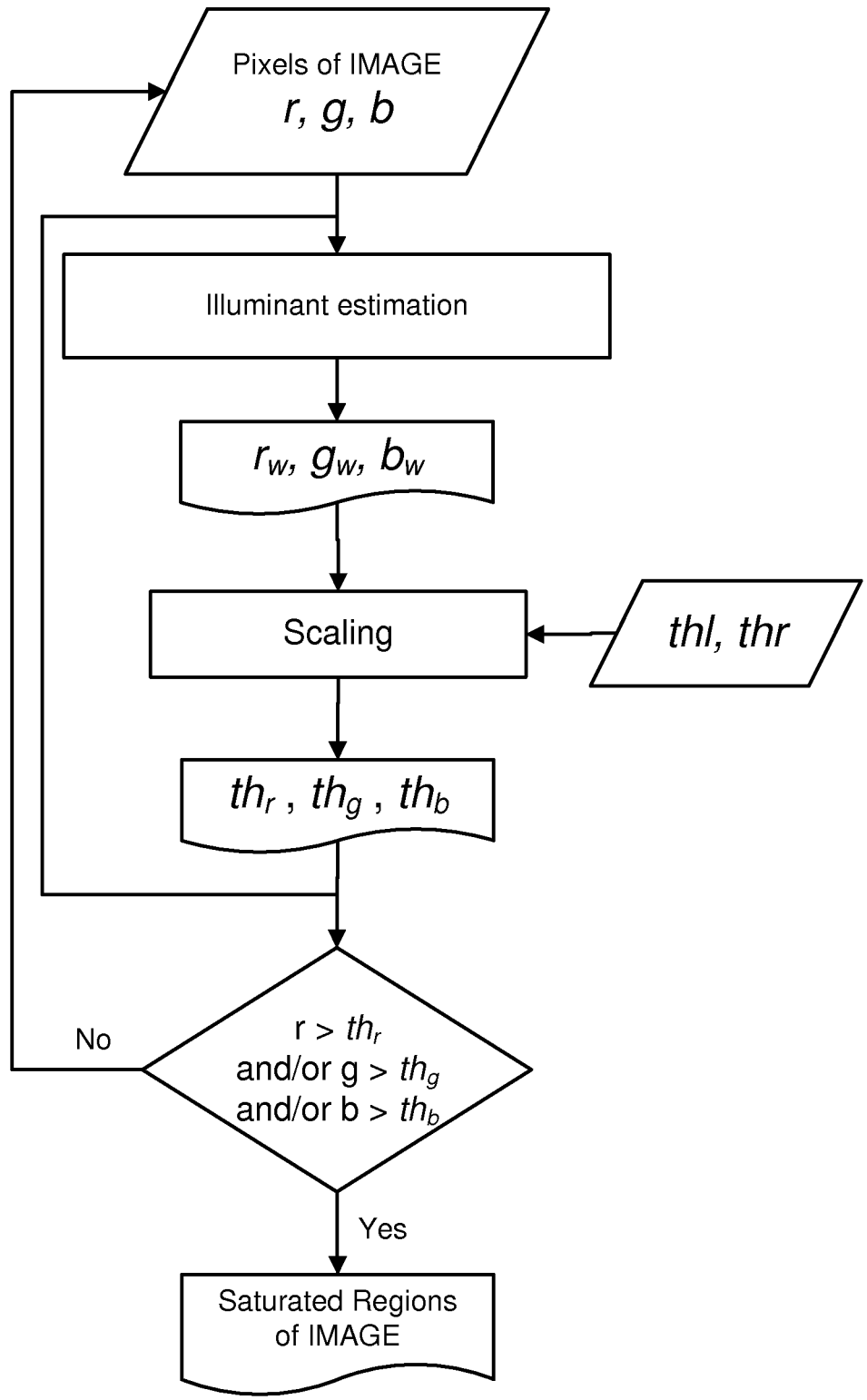

METHOD FOR DETECTION OF SATURATED PIXELS IN AN IMAGE

This application is a U.S. National Stage Application under 35 U.S.C. 371 of International Application PCT/EP2017/057222, filed Mar. 27, 2017, which was published in accordance with PCT Article 21(2) on Oct. 5, 2017, in English, and which claims the benefit of European Patent Application No. 16305372.1 filed Mar. 30, 2016, each of which is incorporated herein by reference in its entirety.

TECHNICAL FIELD

This invention pertains to the field of detection of over-exposed or saturated regions in an image. Such a detection is notably used before color correction, for instance for image restoration or for conversion to higher dynamic range.

BACKGROUND ART

Capturing a wide dynamic range scene with a standard low dynamic range camera can result in saturated or over-exposed images. As most of image or video contents are generally coded in a low or standard dynamic range ("SDR"), they generally contains saturated and/or over-exposed regions. At these times, display devices are now starting to become available that can reproduce wider color gamut, higher dynamic range and higher resolution images or video contents. Therefore, in order to be able to use the full capabilities of such display devices when displaying such SDR contents, a color correction should generally be applied to these contents to recover lost detail and information in the saturated or over-exposed regions of these SDR contents.

A first step for such a correction comprises generally an identification of these over-exposed regions. For example, in a SDR image the colors of which are represented by color coordinates each of which represents a different color channel and is coded in 8 bit, all values of these color coordinates above 255 are generally clipped to a value inferior or equal to 255. Commonly, 235 is considered to be a common and fixed saturation threshold for detecting saturated colors and associated pixels in 8-bit images. One reason for such a value of 235 may be that, above this value, the response of the sensor of a camera that have captured this SDR image is not linear. In most of usual color correction methods that are used to recover lost detail in over-exposed regions of contents, the identification of over-exposed regions is based on excessing a fixed saturation threshold in at least one of these different color channels. These different color channels are for instance the usual R, G and B channels. Given such a saturation threshold, all pixels of an image the colors of which have at least one color channel with a value higher than the saturation threshold are considered over-exposed and form saturated or over-exposed regions of this image.

Using such a fixed saturation threshold value to detect over-exposed regions can be problematic however. In a typical camera sensor, adjacent elements are generally covered by different red, green and blue colored filters corresponding respectively to a R, G and B channel of image data delivered by this camera. As such, different elements of the camera sensor might not receive the same amount of light all the time and they might not reach their maximum capacity all at the same time, subsequently leading to different behavior in the red, green and blue channels of the image data delivered by the camera. This is particularly the case if the light in the scene is not white. Therefore, using a fixed saturation threshold for all three color channels of a RGB image may lead to a wrong detection of over-exposed region and also to an incorrect subsequent color correction.

SUMMARY OF INVENTION

An object of the invention is to avoid the aforementioned drawbacks.

For this purpose, the subject of the invention is a method of detection of saturated pixels in an image the colors of which are represented by color coordinates corresponding to different color channels, comprising detecting pixels the colors of which have at least one color coordinate corresponding to one of said color channels which is superior to a saturation threshold for said color channel, wherein said saturation thresholds for said color channels depend respectively on color coordinates representing an illuminant of said image.

This method limits advantageously wrong detection of saturated pixels, notably because it takes into account the effect of the illuminant of the scene In a first variant, saturation thresholds for said color channels are respectively equal to color coordinates representing said illuminant.

In a second preferred variant, saturation thresholds for said color channels are obtained by scaling color coordinates representing said illuminant into scaled color coordinates such that these scaled color coordinates are included into a fixed range of saturation values.

Said scaling may be performed without change of hue, or, preferably, keeps constant ratios between color coordinates $(r_w, g_w, b_w)$ representing said illuminant (ILL).

An object of the invention is also a module for detection of saturated pixels in an image, the colors of which are represented by color coordinates corresponding to different color channels, said module comprising at least one processor being configured for:
- estimating color coordinates representing an illuminant of said image,
- obtaining saturation thresholds for said color channels in dependence respectively to color coordinates representing said illuminant,
- detecting pixels the colors of which have at least one color coordinate corresponding to one of said color channels which is superior to said saturation threshold for said color channel.

An object of the invention is also a color correction device for correction of colors of an image, wherein said colors are represented by color coordinates corresponding to different color channels, comprising such a module for detection of saturated pixels. Color correction device means here any device configured to change colors of an image, including a change in dynamic range. Such change of colors can be implemented for instance for image restoration or for conversion to higher dynamic range, notably prior to a step of restoring lost details in saturated regions of this image.

An object of the invention is also a computer-readable medium containing a program for configuring a digital computer to perform the method of detection of saturated pixels in an image as described above.

BRIEF DESCRIPTION OF DRAWINGS

The invention will be more clearly understood on reading the description which follows, given by way of non-limiting example and with reference to FIG. 1 illustrating a preferred embodiment of the method of detection of saturated pixels according to the invention.

DESCRIPTION OF EMBODIMENTS

It is to be understood that the method of detection of saturated pixels according to the invention can be implemented in various forms of hardware, software, firmware, special purpose processors, or combinations thereof, notably a combination of hardware and software forming a module for detection of saturated pixels in an image. Moreover, the software may be implemented as an application program tangibly embodied on a program storage unit. The application program may be uploaded to, and executed by, a computer comprising any suitable architecture. Preferably, the computer is implemented on a platform having hardware such as one or more central processing units ("CPU"), a random access memory ("RAM"), and input/output ("I/O") interfaces. The platform may also include an operating system and microinstruction code. The various processes and functions described herein may be either part of the microinstruction code or part of the application program, or any combination thereof, which may be executed by a CPU. In addition, various other peripheral units may be connected to the computer platform such as a display unit and additional data storage unit.

The module for detection of saturated pixels in an image can notably be part of a color correction device. Such a color correction device may notably be configured for the restoration of images or for the conversion of images into higher dynamic range. According to exemplary and non-(imitative embodiments, such a color correction device may be included in a mobile device; a communication device; a game device; a tablet (or tablet computer); a laptop; a still image camera; a video camera; an encoding chip; a still image server; and a video server (e.g. a broadcast server, a video-on-demand server or a web server).

The functions of the various elements shown in FIG. 1 may be provided through the use of dedicated hardware as well as hardware capable of executing software in association with appropriate software.

A description will now be given below of a main embodiment of a method of detection of saturated pixels of an image of a scene, the colors of which are represented in a given color space by a set of RGB color values, wherein each of these color values correspond to a different color channel.

As illustrated on FIG. 1, a first step of this method is an estimation of the color of an illuminant ILL of this scene corresponding to a white point of the image. White point is a color that is perceived by an observer as white in the scene, even if it is not actually white in colorimetry. Preferably, this illuminant is the dominant illuminant of the scene, and its color is represented by a set of RGB color values, namely $r_w$, $g_w$, $b_w$. To estimate this color, one can take the maximum of each color component: the maximal red value $r_{max}$ of all pixels of the image, the maximal green value $g_{max}$ and the maximal blue value $b_{max}$. Such an estimation means that the scene contains objects which reflect all red light, contains objects which reflect all green light and contains objects which reflect all blue light. Therefore, we have: $r_w=r_{max}$, $g_w=g_{max}$, $b_w=b_{max}$. For such an estimation of the illuminant, it is also known to use so-called color constancy algorithms, as those described by Arjan Gijsenij, Theo Gevers, and Joost van De Weijer, in Computational color constancy: Survey and experiments. *IEEE Transactions on Image Processing*, 20(9):2475-2489, 2011. The following color constancy methods were for instance tried: maxRGB, Gray world, Gray edge, Shades of gray, and Bayesian method.

As an example of implementation of this first step, one can more specifically use the method of Jun-yan Huo, Yi-lin Chang, Jing Wang, and Xiao-xia Wei described in the article entitled "Robust automatic white balance algorithm using gray color points in images", in *Consumer Electronics, IEEE Transactions on*, 52(2):541-546, 2006. Such a method comprises the following sub-steps:

Convert $R_iG_iB_i$ color coordinates representing colors of the image in the RGB color space into $L_ia_ib_i$ color coordinates representing the same colors in the CIELab color space, Choose all pixels i of the image I that satisfy Eq. 1, forming a set Ω. This set contains pixels that are not very saturated and thus are more likely to represent whitish areas.

$$\Omega_i = I_i \text{ if } \frac{|a_i|+|b_i|}{L_i} < t. \qquad \text{Eq. 1}$$

Where $a_i$, $b_i$, $L_i$ represent the color of a pixel i in the CIELab color space, where t=0.3 in the proposed implementation.

Compute the color coordinates $r_w$, $g_w$, $b_w$ representing the color of the white point in the RGB color space as the mean RGB value of all pixels in Ω as shown in Eq. 2.

$$W_{rgb} = \frac{\sum_{i=1}^{|\Omega_i|} \Omega_i}{|\Omega_i|}. \qquad \text{Eq. 2}$$

where $W_{rgb}$ is a vector having $r_w$, $g_w$, $b_w$ as coordinates.

As a variant of example of implementation of this first step, pixels having saturated (or clipped) colors values thr are not considered for the computing of the mean RGB value. It means that pixels having colors that are already reaching saturation are not likely to correctly represent the white point of the image and should therefore not be included in the computation. To achieve that, Eq. 1 above can be rewritten as $$\Omega_i = I_i \text{ if } \frac{|a_i|+|b_i|}{L_i} < t \text{ and } I_i < thr$$

As such, only pixels i having color values $I_i$ below thr are included for the computation of the mean RGB value of equation 2, as it is assumed that any color above saturation threshold thr is likely to be clipped. In this variant, we don't have a high and low threshold as below. So thr is just the saturation threshold. It can be set to the same value as thr in the fixed range.

In a first variant of detection of saturated pixels in the image, the color coordinates $r_w$, $g_w$ and $b_w$ of the estimated illuminant are retained as threshold values $th_r$, $th_g$ and $th_b$ respectively for the R, G and B color channel for the detection of saturated pixels. If $th_r=r_w$, $th_g=g_w$ and $th_b=b_w$, it means that a color of the image having r, g and b color coordinates is considered as saturated if $r>th_r$ and/or $g>th_g$ and/or $b>th_b$.

But color coordinates $r_w$, $g_w$, $b_w$ representing the color of an illuminant as estimated from an SDR image have very often values that are too low to be appropriate to be used directly as saturation thresholds for over-exposure or saturation detection. As a matter of fact, using very low saturation threshold values could lead to misdetection of some well exposed pixels. That is why a second variant of detection of saturated pixels in the image is preferred, which is illustrated on FIG. 1, in which saturation threshold values $th_r$, $th_g$, $th_b$ are obtained by scaling the estimated color coordinates $r_w$, $g_w$, $b_w$ of the color $W_{rgb}$ of the illuminant to higher values; preferably, this scaling keeps constant ratios between color coordinates of the illuminant in RGB color space: it means for instance that $th_r/th_g = r_w/g_w$ and $th_g/th_b = g_w/b_w$. Such a scaling is considered as a second step of the method of detection.

As an example of this scaling, threshold values $th_r$, $th_g$ and $th_b$ are obtained respectively for the R, G and B color channels by shifting the color coordinates $r_w$, $g_w$, $b_w$ of the evaluated illuminant into a fixed range [thl, thr], where thl and thr are lower and upper limits of possible over-exposure threshold intensities/luminance. The values thl and thr are notably set by the user. In the below implementation performed in the context in which RGB colors values are encoded over 8 bits, thl=175 and thr=235.

If $\min(W_{rgb})$ is the minimum coordinate among color coordinates $r_w$, $g_w$, $b_w$ of the illuminant, if $\max(W_{rgb})$ is the maximum coordinate among color coordinates $r_w$, $g_w$, $b_w$, then a threshold vector th having $th_r$, $th_g$ and $th_b$ as coordinates is defined as follows:

$$th = w_{rgb} + [thl - \min(w_{rgb})] \text{ if } \min(w_{rgb}) < thl. \quad \text{Eq. 3}$$
$$\text{otherwise } th = thl$$

$$th = \frac{thr}{\max(w_{rgb})} w_{rgb} \text{ if, } \max(w_{rgb}) < thr \quad \text{Eq. 4}$$
$$\text{otherwise } th = thr$$

Eq. 3 and 4, each affects only elements within th that are below thl or above thr respectively. As such these equations are independent.

If for example we find that $\min(W_{rgb})=r_w$, i.e. the red value, then Eq. 3 would become $$th_r = \begin{cases} r_w + [thl - r_w], & \text{if } r_w < thl \\ r_w, & \text{otherwise} \end{cases}$$

$$th_g = \begin{cases} g_w + [thl - r_w], & \text{if } g_w < thl \\ g_w, & \text{otherwise} \end{cases}$$

$$th_b = \begin{cases} b_w + [thl - r_w], & \text{if } b_w < thl \\ b_w, & \text{otherwise} \end{cases}$$

Note that in the $2^{nd}$ and $3^{rd}$ line above, we still subtract $r_w$ from thl since it was found to be the minimum element of $W_{rgb}$. If any of the elements $r_w$, $g_w$, $b_w \geq thl$ then this element remains unchanged.

Similarly, for Eq. 4, if we find that $\max(W_{rgb})=g_w$ for instance, i.e. the green value, then Eq. 4 effectively becomes $$th_r = \begin{cases} \frac{thr}{g_w} r_w & \text{if } r_w > thr \\ r_w, & \text{otherwise} \end{cases}$$

$$th_g = \begin{cases} \frac{thr}{g_w} g_w & \text{if } g_w > thr \\ g_w, & \text{otherwise} \end{cases}$$

$$th_b = \begin{cases} \frac{thr}{g_w} b_w & \text{if } b_w > thr \\ b_w, & \text{otherwise} \end{cases}$$

Again, if any of the elements $r_w$, $g_w$, $b_w \leq thr$ then this element remains unchanged.

Equation 3 means that threshold values $th_r$, $th_g$ and $th_b$ used for the detection of saturated colors are obtained by a same translation $[thl - \min(W_{rgb})]$ of all color coordinates $r_w$, $g_w$, $b_w$ of the illuminant.

Equation 4 means that threshold values $th_r$, $th_g$ and $th_b$ used for the detection of saturated colors are obtained by a same homothety of all color coordinates $r_w$, $g_w$, $b_w$ of the illuminant, using a homothety ratio $$\frac{thr}{\max(w_{rgb})}$$

which is superior to 1.

In a third step illustrated on FIG. 1, saturated pixels in the image are identified as those having colors represented by r, g, and b color coordinates such that $r > th_r$ and/or $g > th_g$ and/or $b > th_b$. These saturated pixels form saturated regions of the image.

In a variant of the above scaling, this scaling is partially performed in a perceptually-uniform color space (as LCh color space) instead of being entirely performed in a device-dependent RGB color space as above.

In a first sub-step of this variant, an intermediate threshold vector th' is calculated by scaling the color $W_{rgb}$ of the illuminant such that the green component $g_w$ of this illuminant is scaled into thr as follows:

$$th' = W_{rgb} * \frac{thr}{g_w}. \quad \text{Eq. 5}$$

The green component is preferably chosen for this scaling sub-step because it has the largest contribution to the luminance of the image, as opposed to the red and to the blue component. But it is also possible to use the red or the blue component of the illuminant for this scaling.

If any of the color components $th'_r$, $th'_g$ and $th'_b$ of the intermediate threshold vector th' exceeds the maximum bit value, here 255, then, after color conversion of these color components $th'_r$, $th'_g$ and $th'_b$ representing the threshold color in the RGB color space into color components $th'_L$, $th'_C$ and $th'_h$ representing the same color the LCh color space, the Chroma component $th'_C$ is scaled into a reduced value $th''_C = k \cdot th'_C$ such that none of the color components $th''_r$, $th''_g$ and $th''_b$ resulting from the conversion in the RGB color space of the color components $th'_L$, $th''_C$ and $th'_h$ exceeds the maximum 255 bit value, where k is as closed as possible to 1 and inferior to 1. Such a value of k can be found by iteration. The final threshold color th" is the color represented in the RGB color space by the color components $th''_r$, $th''_g$ and $th''_b$.

Because the above chroma scaling is performed without change of hue, this variant of scaling ensures advantageously that the hue of the illumination point of the image is not changed and therefore any inadvertent hue changes is advantageously avoided in the saturated/clipped area corrections after detecting saturated pixels in the image. Since the illumination point is adjusted by scaling its Chroma component in the CIE LCh color space, it becomes less and less saturated, preserving advantageously its hue.

The method and module for detecting saturated pixels in an image of a scene which has been described above limit advantageously wrong detection of saturated pixels, notably because this detection takes into account the effect of the illuminant of the scene.

Although the illustrative embodiments of the invention have been described herein with reference to the accompanying drawing, it is to be understood that the present invention is not limited to those precise embodiments, and that various changes and modifications may be effected therein by one of ordinary skill in the pertinent art without departing from the invention. All such changes and modifications are intended to be included within the scope of the appended claims. The present invention as claimed therefore includes variations from the particular examples and preferred embodiments described herein, as will be apparent to one of skill in the art.

While some of the specific embodiments may be described and claimed separately, it is understood that the various features of embodiments described and claimed herein may be used in combination.

The invention claimed is:

1. A method of detection of saturated pixels in an image the colors of which are represented by color coordinates corresponding to different color channels, comprising detecting pixels the colors of which have at least one color coordinate corresponding to one of said color channels which is superior to a saturation threshold for said color channel, wherein saturation thresholds for said color channels are respectively equal to color coordinates representing an estimated illuminant of said image, said estimated illuminant corresponding to a white point of the image, which is a color that is perceived by an observer as white in the scene of the image.

2. The method of detection according to claim 1, wherein saturation thresholds for said color channels are obtained by scaling color coordinates representing said estimated illuminant into scaled color coordinates such that these scaled color coordinates are included into a fixed range of saturation values.

3. The method of detection according to claim 1, wherein saturation thresholds for said color channels are obtained by scaling color coordinates representing said estimated illuminant into scaled color coordinates such that said scaling is performed without change of hue.

4. The method of detection according to claim 1, wherein saturation thresholds for said color channels are obtained by scaling color coordinates representing said estimated illuminant into scaled color coordinates such that said scaling keeps constant ratios between color coordinates representing said estimated illuminant.

5. A detection device for the detection of saturated pixels in an image, the colors of which are represented by color coordinates corresponding to different color channels, comprising at least one processor configured for:

obtaining color coordinates representing an estimated illuminant of said image, said estimated illuminant corresponding to an estimated white point of the image, which is a color that is perceived by an observer as white in the scene of the image, obtaining saturation thresholds for said color channels wherein said saturation thresholds for said color channels are respectively equal to color coordinates representing said estimated illuminant, detecting pixels the colors of which have at least one color coordinate corresponding to one of said color channels which is superior to said saturation threshold for said color channel.

6. The detection device according to claim 5, wherein said scaling of color coordinates into scaled color coordinates is performed such that these scaled color coordinates are included into a fixed range of saturation values.

7. A color correction device for correction of colors of an image, wherein said colors are represented by color coordinates corresponding to different color channels, wherein said color correction device comprises the detection device for the detection of saturated pixels according to claim 5.

8. An electronic device incorporating the color correction device of claim 7.

9. The electronic device according to claim 8, selected from a group consisting of a communication device, a game device, a tablet, a laptop, a still image camera, a video camera, an encoding chip, a still image server and a video server.

10. A non-transitory computer-readable medium containing a program for configuring a digital computer to perform a method of detection of saturated pixels in an image the colors of which are represented by color coordinates corresponding to different color channels, said method comprising detecting pixels the colors of which have at least one color coordinate corresponding to one of said color channels which is superior to a saturation threshold for said color channel, wherein saturation thresholds for said color channels are respectively equal to color coordinates representing an estimated illuminant of said image, said estimated illuminant corresponding to a white point of the image, which is a color that is perceived by an observer as white in the scene of the image.

* * * * *